(12) United States Patent
Kasperek (10) Patent No.: US 7,173,197 B1
(45) Date of Patent: Feb. 6, 2007

(54) HANDHELD FISH MEASURING APPARATUS WITH INTEGRAL CAMERA

(75) Inventor: Michael Kasperek, Raleigh, NC (US)

(73) Assignee: Adstracts, Inc., Raleigh, NC (US)

( * ) Notice: Subject to any disclaimer, the term of this patent is extended or adjusted under 35 U.S.C. 154(b) by 0 days.

(21) Appl. No.: 11/348,960

(22) Filed: Feb. 7, 2006

Related U.S. Application Data

(60) Provisional application No. 60/712,733, filed on Aug. 30, 2005.

(51) Int. Cl.
H04N 5/14 (2006.01)
G01G 19/52 (2006.01)
G01B 3/12 (2006.01)
G01B 1/00 (2006.01)
A01K 99/00 (2006.01)

(52) U.S. Cl. .................. 177/131; 177/148; 33/511; 33/734; 33/772; 358/909.1; 348/333.02; 43/4

(58) Field of Classification Search ............. 177/131, 177/148–149; 33/511, 734, 772; 43/4; 358/909.1; 348/333.02
See application file for complete search history.

(56) References Cited

U.S. PATENT DOCUMENTS

| | | | |
|---|---|---|---|
| 3,389,798 A * | 6/1968 | Hartmann et al. .......... 210/150 |
| 4,285,131 A * | 8/1981 | Demchak et al. ............ 33/747 |
| 4,382,336 A * | 5/1983 | Call ........................... 33/734 |
| 4,631,851 A | 12/1986 | Whitehurst |
| 4,718,507 A | 1/1988 | Howlett et al. |
| 4,753,031 A | 6/1988 | Owen |
| 4,839,675 A | 6/1989 | Owen |
| 4,936,399 A | 6/1990 | Christman et al. |
| 5,031,710 A | 7/1991 | Parker et al. |
| 5,121,328 A * | 6/1992 | Sakai et al. ................. 705/407 |
| 5,331,419 A * | 7/1994 | Yamada et al. ............... 348/64 |
| 5,541,656 A * | 7/1996 | Kare et al. ............. 348/333.02 |
| 5,637,838 A | 6/1997 | Arey et al. |
| 5,922,999 A | 7/1999 | Yang |
| 6,094,996 A | 8/2000 | Campbell et al. |
| 6,222,449 B1 | 4/2001 | Twining |
| 6,392,697 B1 * | 5/2002 | Tanaka et al. ........... 348/220.1 |
| 6,429,391 B1 | 8/2002 | Gruver |
| 6,452,626 B1 * | 9/2002 | Adair et al. ................ 348/158 |
| 6,560,913 B1 | 5/2003 | Liao |

(Continued)

FOREIGN PATENT DOCUMENTS

WO WO 2005/025309 A1 3/2005

Primary Examiner—Randy W. Gibson
(74) Attorney, Agent, or Firm—Myers Bigel Sibley & Sajovec (57) ABSTRACT

A handheld apparatus for measuring fish, game, and the like is provided and includes a scale, a camera, and a length measuring device. The scale includes a support member that extends outwardly from the apparatus housing, and a display that is visible through the housing. The support member is configured to suspend an object therefrom for weighing via the scale, and the display is configured to display the weight of an object suspended from the support member. The length measurement device is configured to measure the length of an object and the display is configured to display the length of an object measured by the length measurement device. The camera includes a lens, an image sensor configured to capture images obtained via the lens, and a camera display. The camera display displays an image of an object taken by the camera with weight and/or length information for the object.

26 Claims, 10 Drawing Sheets

U.S. PATENT DOCUMENTS

| | | |
|---|---|---|
| 6,608,261 B2 * | 8/2003 | Thadani ...................... 177/126 |
| 6,696,650 B2 | 2/2004 | Muller et al. |
| 6,765,155 B1 | 7/2004 | Gray |
| 6,889,444 B2 * | 5/2005 | Trout et al. .................... 33/773 |
| 6,904,298 B2 * | 6/2005 | Arai et al. ............... 455/556.1 |
| 2004/0163267 A1 | 8/2004 | Bini |

* cited by examiner

HANDHELD FISH MEASURING APPARATUS WITH INTEGRAL CAMERA

RELATED APPLICATION

This application claims the benefit of and priority to U.S. Provisional Patent Application No. 60/712,733 filed Aug. 30, 2005, the disclosure of which is incorporated herein by reference as if set forth in its entirety.

FIELD OF THE INVENTION

The present invention relates generally to measuring apparatus and, more particularly, to apparatus for measuring and recording data about fish, game and the like.

BACKGROUND OF THE INVENTION

Many fishing enthusiasts keep a personal log of their fishing activities, including time, date and location of a fishing activity, as well as information about any fish caught, including species, weight, length, etc. Portable devices that allow fishing enthusiasts to quickly weigh and measure fish are known. For example, U.S. Pat. No. 6,765,155 describes a portable device for weighing and measuring fish. U.S. Pat. No. 6,696,650 to Muller et al. describes an electronic fish scale with a digital output screen. Unfortunately, recording data from these portable devices into a written log can be inconvenient and/or cumbersome during an outing. Moreover, written logs may omit useful details or may include inaccurate information if written after an outing. As such, a need exists for more accurately and conveniently recording fishing activity information.

SUMMARY OF THE INVENTION

In view of the above discussion, a handheld apparatus for measuring fish, game, and the like is provided and includes a scale, a camera, and a length measuring device. The scale includes a support member that extends outwardly from the apparatus housing, and a display that is visible through the housing. The support member is configured to suspend an object (e.g., fish, game, etc.) therefrom for weighing via the scale, and the display is configured to display the weight of an object suspended from the support member. The length measurement device is configured to measure the length of an object (e.g., fish, game, etc.), and the display is configured to display the length of an object measured by the length measurement device.

According to some embodiments of the present invention, the length measurement device includes a wheel rotatably mounted on the apparatus housing such that a portion of an outer periphery of the wheel can engage a surface. Rotation of the wheel along a surface adjacent an object indicates a length of the object. According to some embodiments of the present invention, the length measurement device includes a retractable tape measure.

According to some embodiments of the present invention, the camera includes a lens, an image sensor configured to capture images obtained via the lens, and a camera display. The camera display is configured to display an image of an object taken by the camera with weight information for the object obtained from the scale and/or with length information for the object obtained from the length measurement device.

DETAILED DESCRIPTION OF THE INVENTION

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the apparatus in the figures is inverted, elements described as "under" or "beneath" other elements or features would then be oriented "over" the other elements or features. Thus, the exemplary term "under" can encompass both an orientation of "over" and "under". The apparatus may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a "first" element, component, region, layer or section discussed below could also be termed a "second" element, component, region, layer or section without departing from the teachings of the present invention.

Referring now to the figures, a handheld apparatus 10 for measuring fish, game, and the like, according to embodiments of the present invention, is illustrated. The illustrated apparatus 10 is designed for use by sportsmen, such as fishermen, and includes an a housing 12, a scale 14 disposed within the housing 12 that is configured to weigh objects, such as fish, game, etc., and a camera 16 disposed within the housing 12 and configured to take images of objects, such as fish, game, etc.

The housing 12 includes opposite front and rear portions 12a, 12b, opposite side portions 12c,12d, and top and bottom portions 12e,12f, as illustrated. The housing 12 may be formed from various types of materials including various types of polymeric materials. According to some embodiments of the present invention, the housing 12 is substantially waterproof or water resistant and prevents the ingress of water and moisture therein. According to some embodiments of the present invention, the housing 12 is configured to be buoyant such that the apparatus 10 floats if dropped into water. Alternatively, buoyant material may be attached to (or disposed within) the housing 12 that causes the apparatus 10 to float in water.

Figure 1:
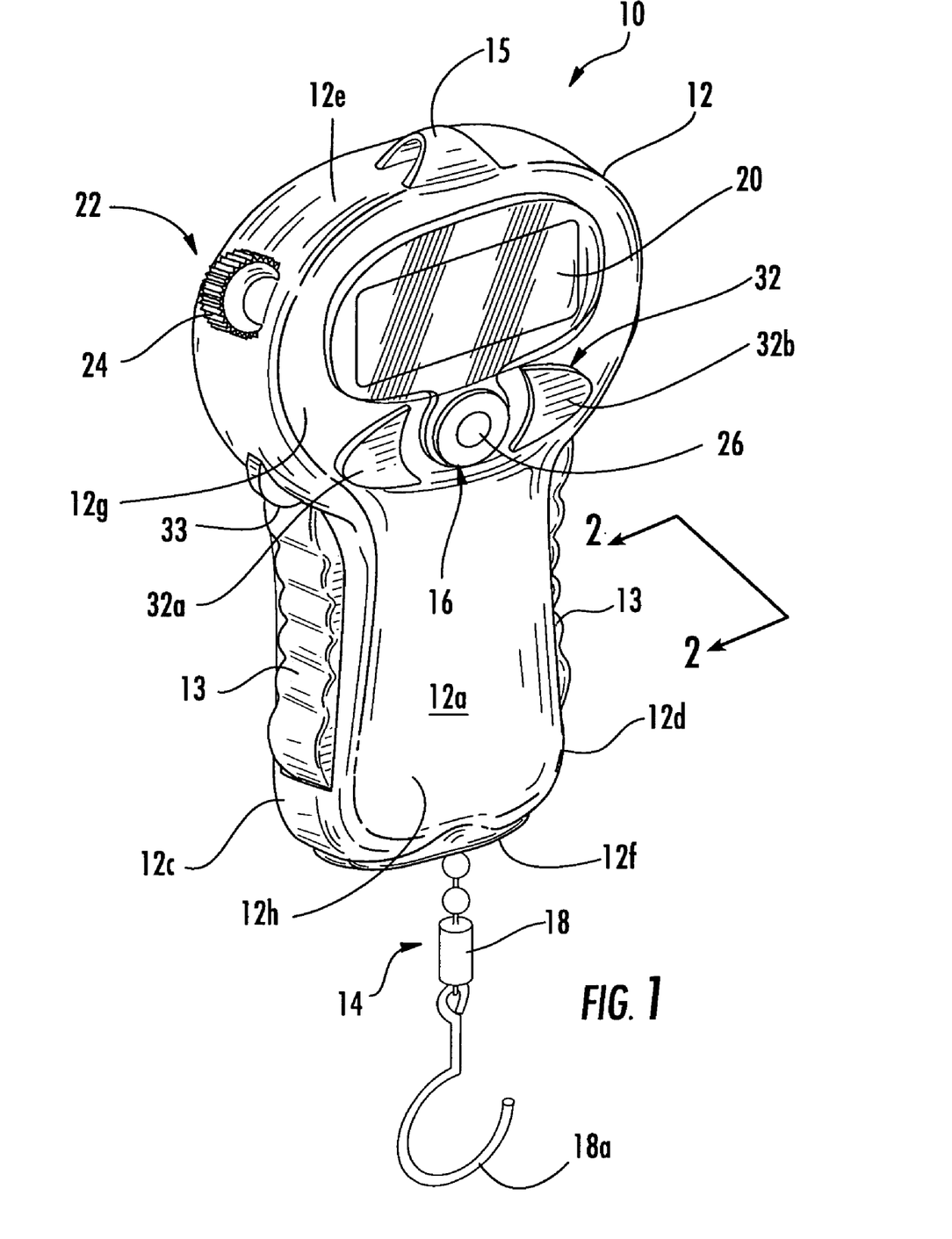
FIG. 1 is a perspective view of a handheld measuring apparatus, according to embodiments of the present invention.
Figure 3:
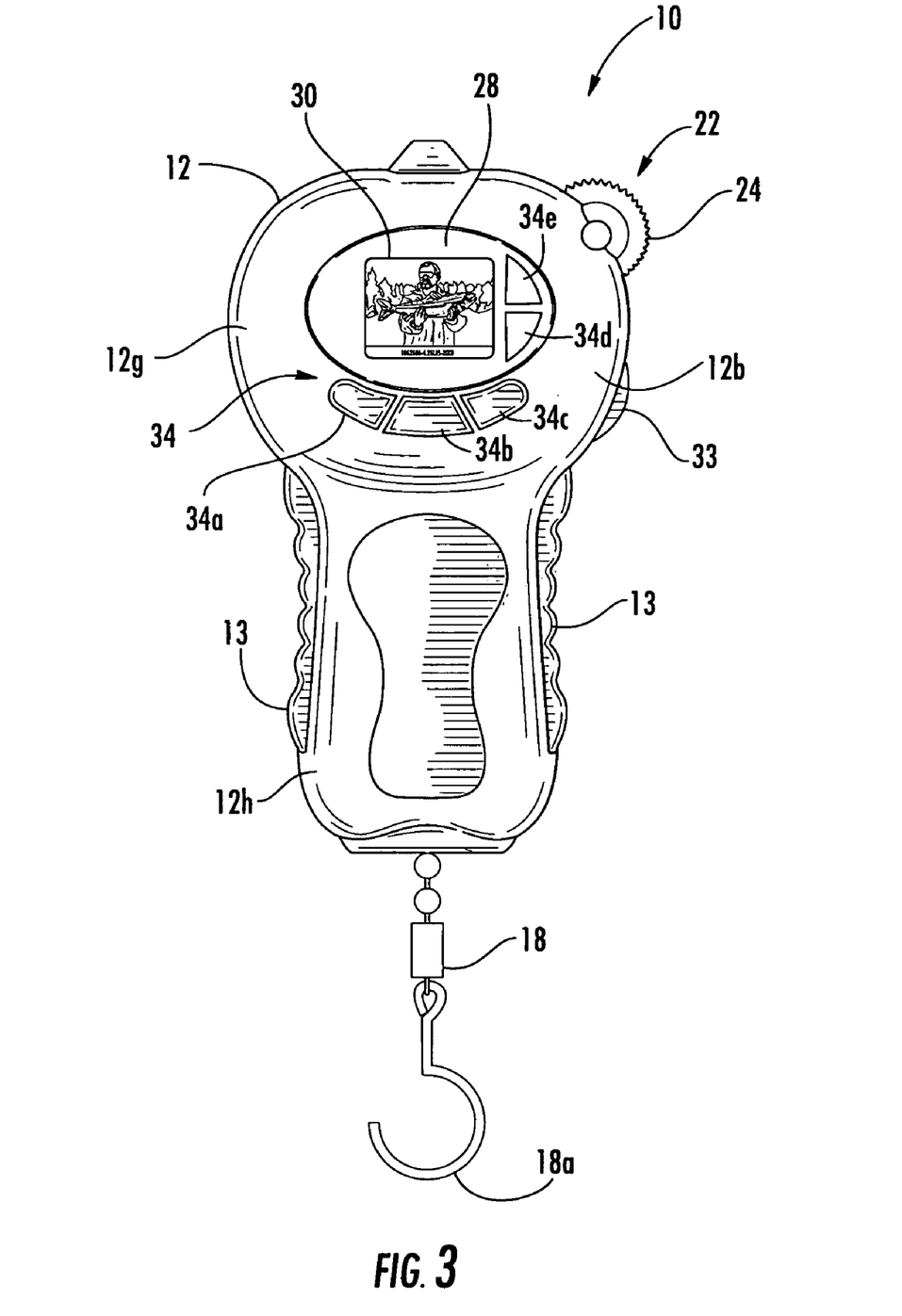
FIG. 3 is a rear view of the handheld measuring apparatus of FIG. 1.
Figure 4:
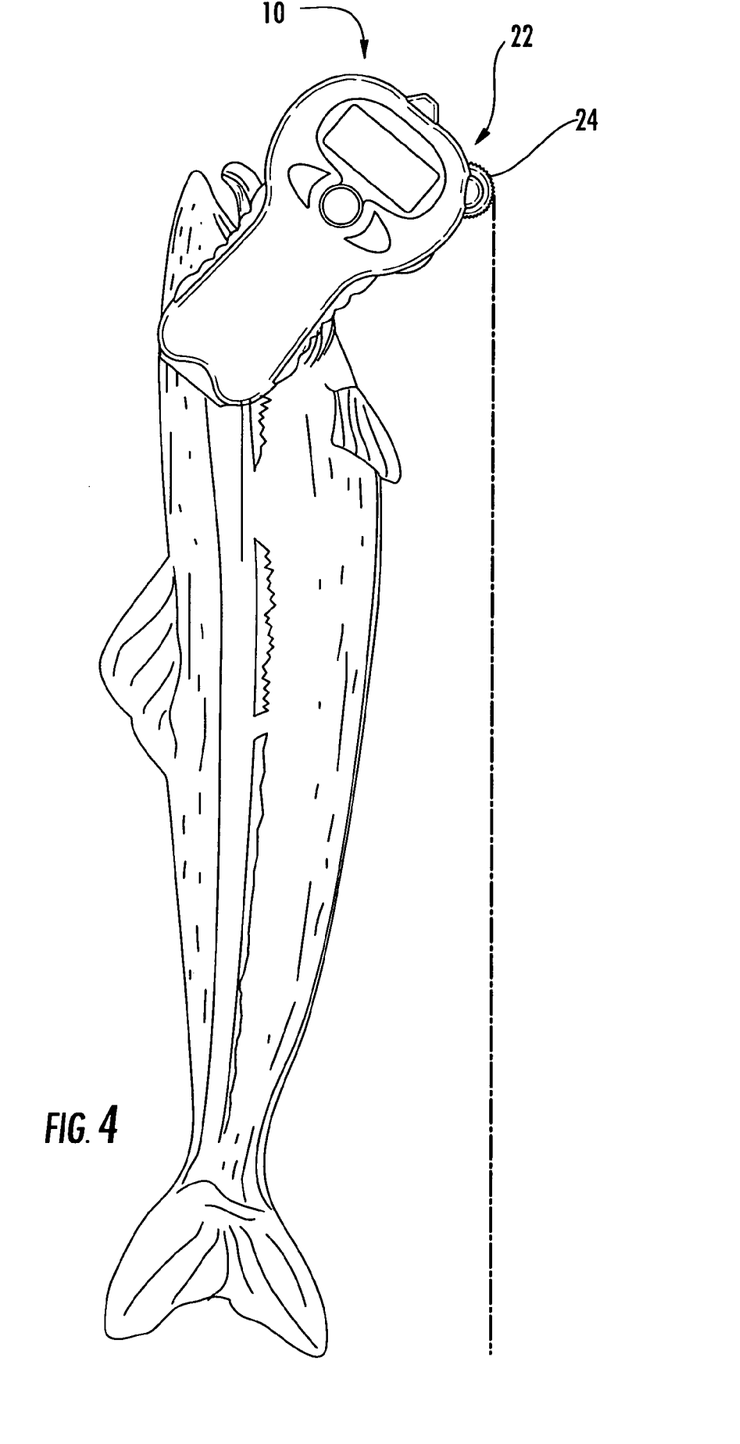
FIGS. 4–5 illustrates the length of an object, such as a fish, being measured via the handheld measuring apparatus of FIG. 1.
Figure 5:
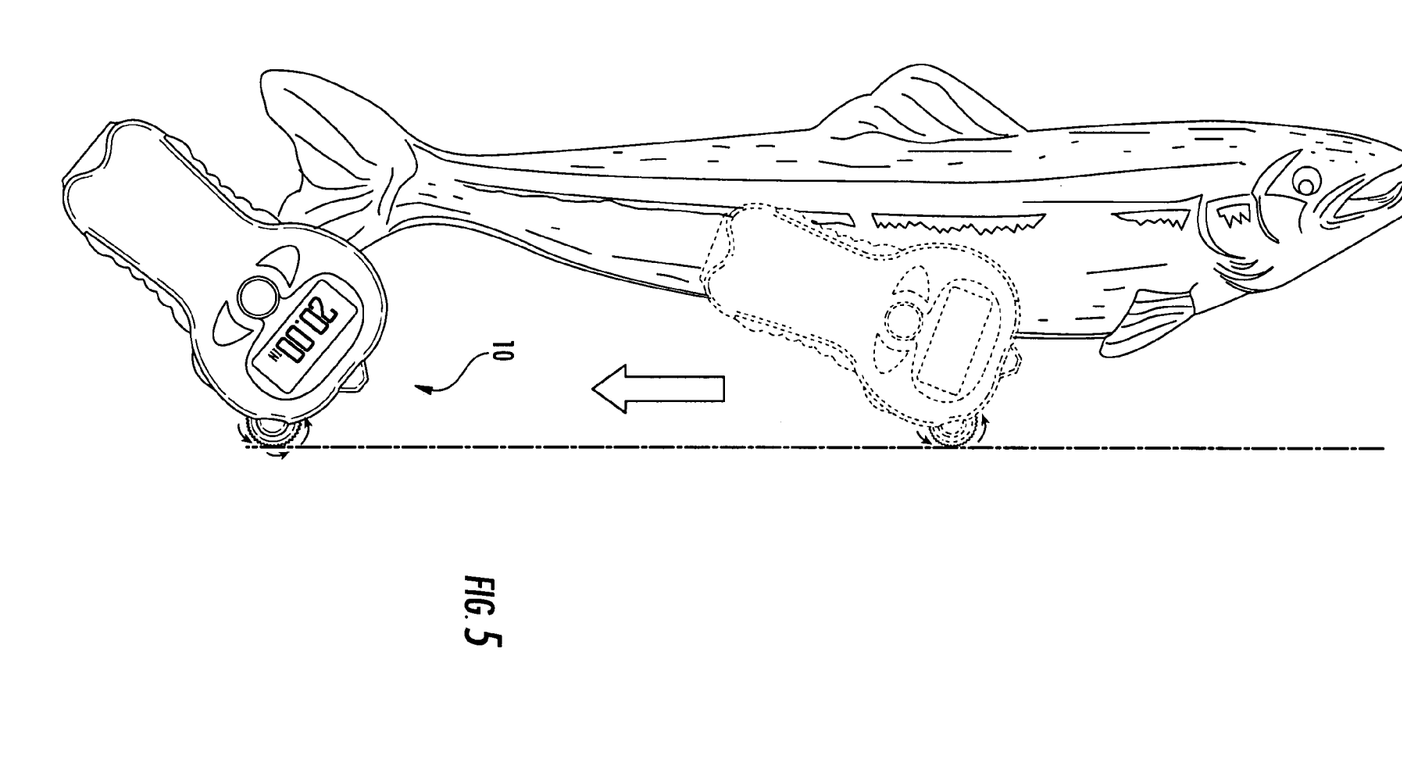

The illustrated housing 12 has an ergonomic shape with an enlarged upper portion 12g and an elongated handle portion 12h. The upper portion 12g includes a display, camera lens, and user interface on the housing front portion 12a (FIG. 1), as will be described below. The upper portion 12g includes a camera display and camera user interface on the housing rear portion 12b (FIG. 3), as will be described below. The illustrated handle portion 12h is configured to be conducive to gripping by a user's hand and includes tactile material (e.g., rubber, silicone, etc.) 13 at the side portions 12c,12d that helps a user grip the housing 12 and that resists slipping, particularly when the apparatus 10 is wet.

The illustrated housing 12 also includes a strap loop 15 located on the housing top portion 12e. A user may insert a strap, lanyard or other device through strap loop 15 to facilitate carrying/securing the apparatus 10.

The scale 14 may be virtually any type of scale configured to weigh an object and generate an electronic signal such as, for example, a scale that utilizes the linear displacement of a spring along a variable resister. Scales are well understood by those skilled in the art of the present invention, and need not be described further herein. Exemplary scales are described in U.S. Pat. Nos. 5,031,710 and 6,696,650. Embodiments of the present invention are not limited to a particular type of scale.

Figure 6:
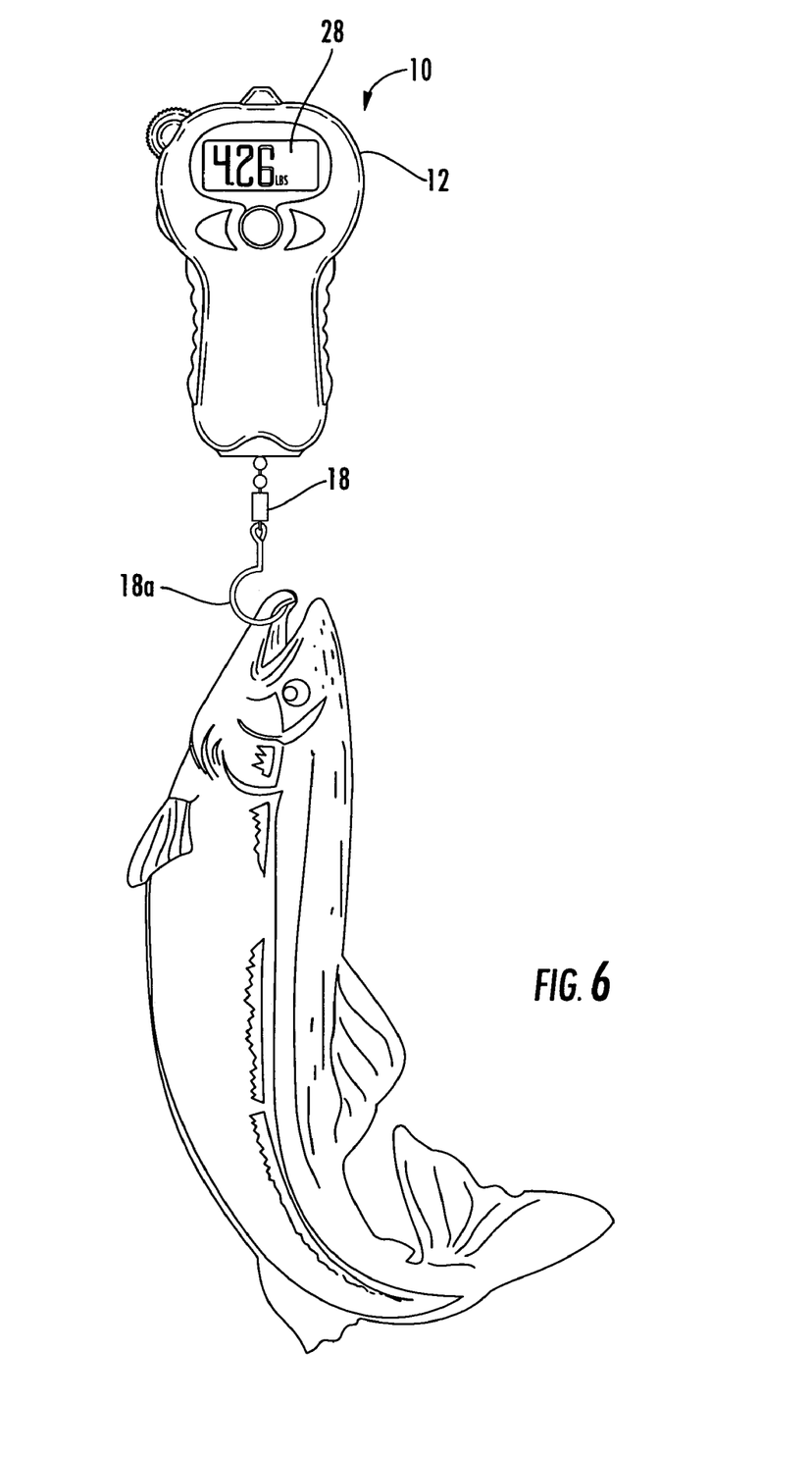
FIG. 6 illustrates the weight of an object, such as a fish, being measured via the handheld measuring apparatus of FIG. 1.
Figure 7:
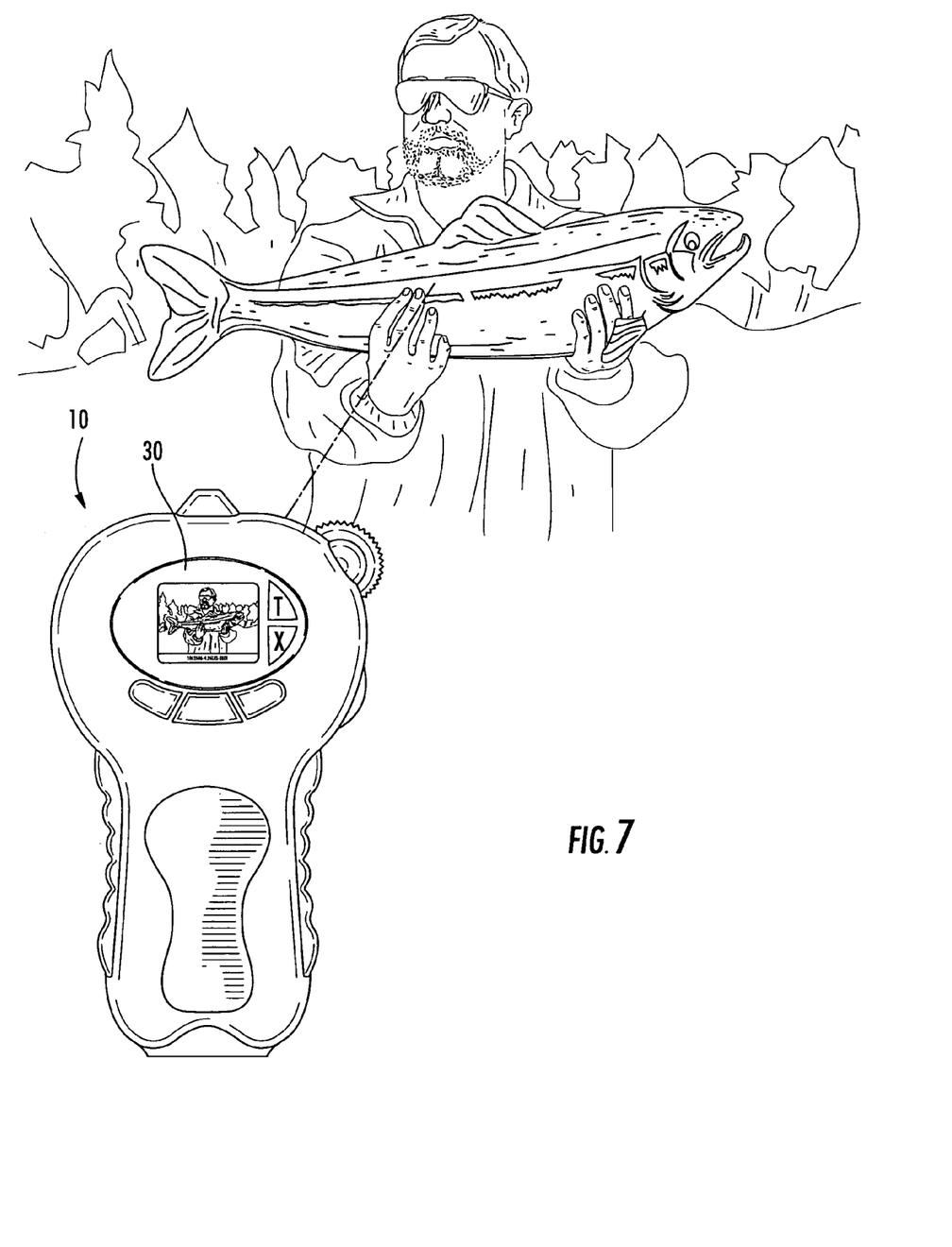
FIG. 7 illustrates taking an image via the camera of the handheld measuring apparatus of FIG. 1.

The illustrated scale 14 includes a support member 18 that extends outwardly from the internal portion (e.g., from a linear displacement spring) within the housing 12. The illustrated support member 18 has a free end 18a with a hook configuration that is configured to suspend an object, such as a fish, therefrom (FIG. 6). A display 20 is visible through the housing 12 and is configured to display the weight of an object suspended from the support member 18 as illustrated, for example, in FIG. 6. Display 20 may be any of various types of displays including, for example, a liquid crystal display (LCD).

The handheld measuring apparatus 10 also includes a length measurement device 22 that is configured to measure the length of an object. The length measurement device 22 includes a wheel 24 that is rotatably mounted on the housing such that a portion of an outer periphery of the wheel 24 can engage a surface. Rotation of the wheel along a surface adjacent an object generates a signal that is used to indicate a length of the object. Length information is displayed within display 20. The length measurement device 22 may include a reset button/function that a user utilizes after measuring the length of an object. This resets the length measurement device 22 to "zero" such that the length of a next object can be measured. The reset button/function can be facilitated in various ways, such as via a mechanical button or electro/mechanical button associated with the length measurement device 22 and/or via the user interface 32.

Figure 9:
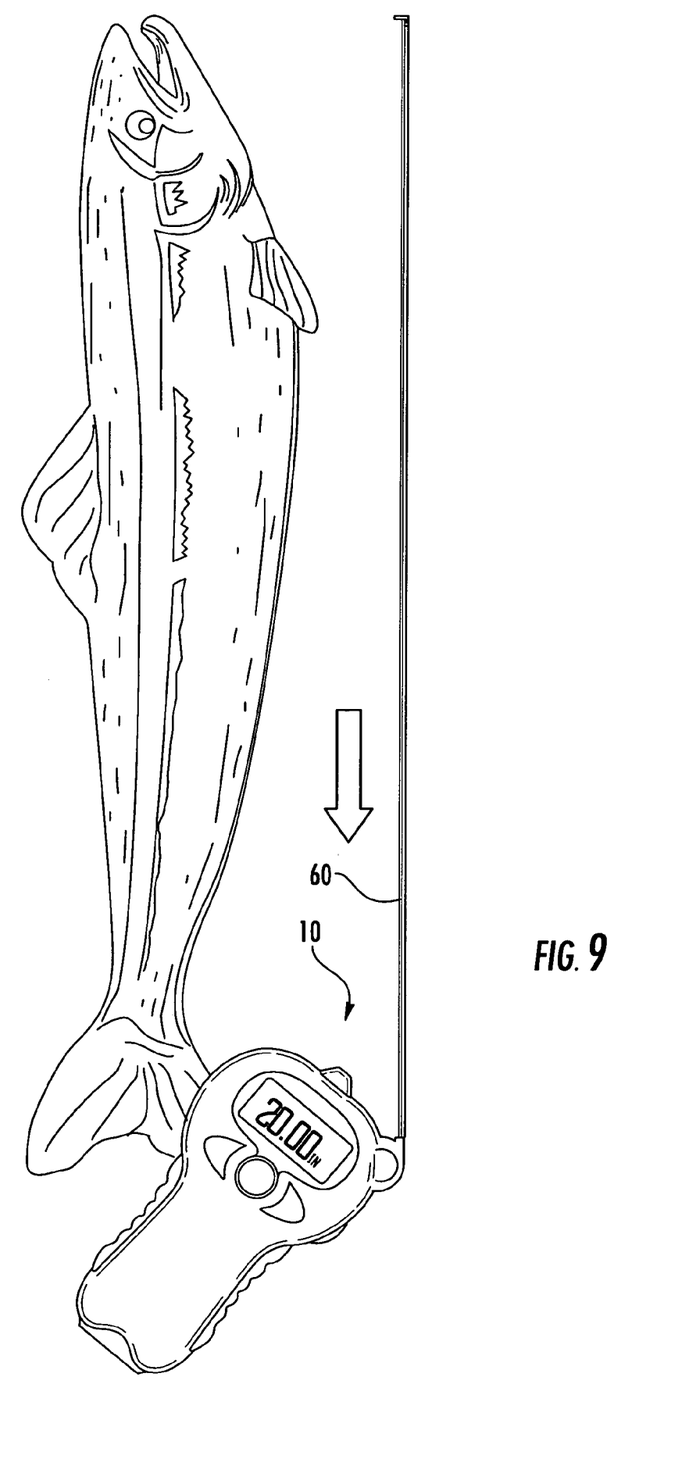
FIG. 9 illustrates the length of an object, such as a fish, being measured via a handheld measuring apparatus having a retractable tape measure, according to some embodiments of the present invention.
Figure 9A:
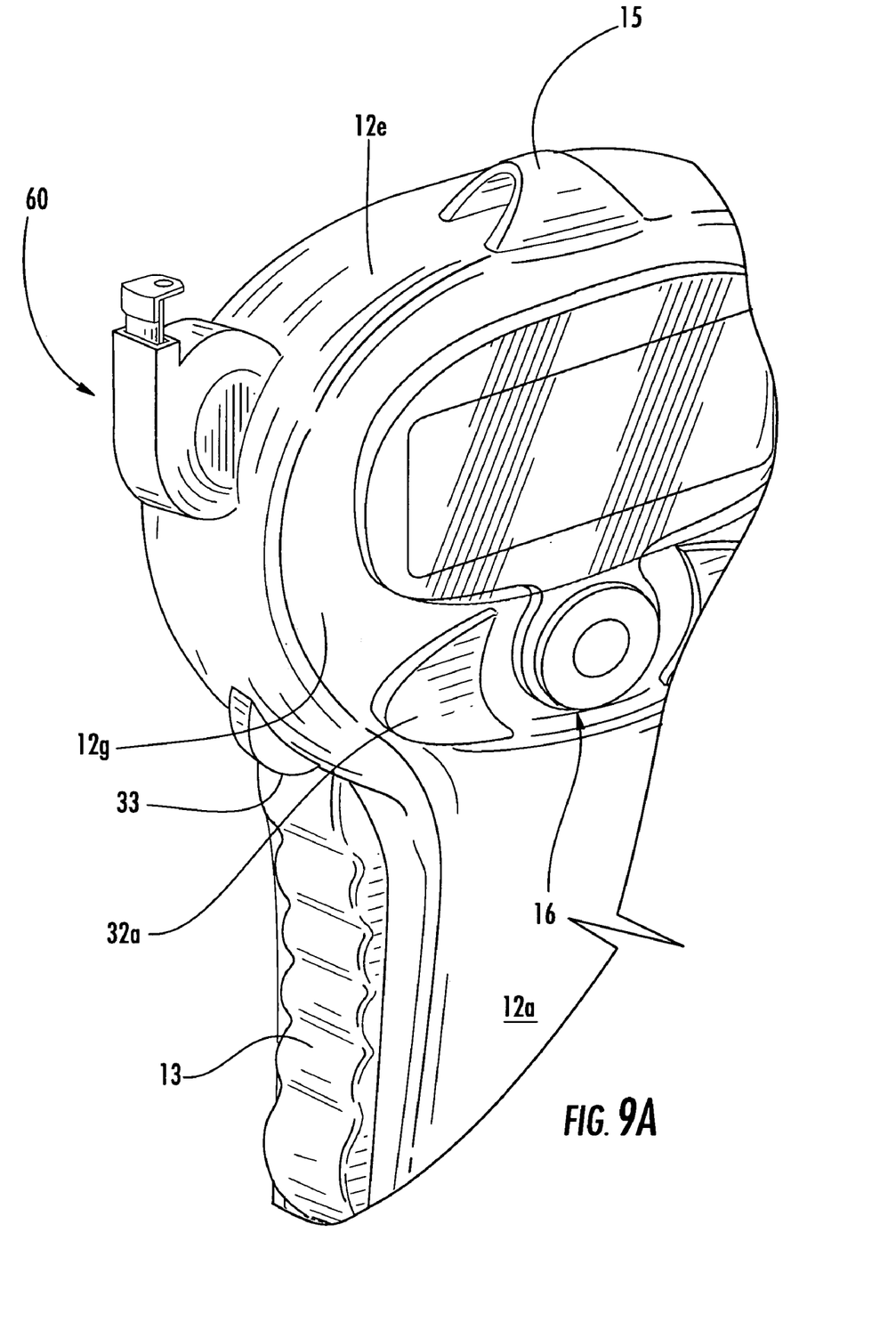
FIG. 9A is a partial perspective view of the handheld measuring apparatus of FIG. 9, illustrating the retractable tape measure.

According to another embodiment of the present invention illustrated in FIGS. 9–9A, the handheld measuring apparatus 10 may include a retractable tape measure 60 that serves as a length measurement device and that is configured to measure the length of an object. Embodiments of the present invention are not limited to the illustrated retractable tape measure 60. A retractable tape measure may have various configurations and may extend from the housing 12 in various locations, without limitation. According to some embodiments, length information measured by the tape measure 60 is displayed within display 20.

The camera 16 includes a lens 26 that extends through the housing 12, an image sensor (not shown) that is located within the housing 12 and that is configured to capture images obtained via the lens 26. The camera 16 also includes a camera display 28 that is visible through the housing rear wall 12b. The camera display 28 is configured to display an image 30 of an object taken by the camera 16 with various information displayed within the image. For example, weight information and/or length information can be displayed within an image. The camera display 28 may be a color display or a black and white display. Exemplary types of camera displays include, but are not limited to, LCDs.

The camera 16 may be any of various types of digital cameras. For example, the camera 16 may be capable of producing SVGA quality resolution images (1024×768 pixels) and may have other features such as a 3 to 1 zoom, etc. However, camera 16 may be configured to produce various kinds and sizes of images, without limitation. Captured images can be downloaded to a computer (e.g., via a USB connection, wirelessly, etc.) and printed. Alternatively, images can be printed directly from the device itself. As described herein, printed images can include various information, such as fish weight and length, time and date, etc. The camera may include a flash, according to embodiments of the present invention.

According to embodiments of the present invention, the camera display 28 may be a color display or a black and white display. Exemplary types of camera displays include, but are not limited to, liquid crystal displays.

A user interface 32 is provided on the housing front portion 12a and includes two buttons 32a,32b disposed on opposite sides of camera lens 26. The illustrated user interface 32 enables a user to operate the scale 14 and length measuring device 22. For example, according to some embodiments of the present invention, button 32a is configured to input weight information into an image of an object after the object, such as a fish, has been weighed. Button 32b is configured to input length information into an image of an object after the length of the object, such as a fish, has been measured. However, embodiments of the present invention are not limited to the illustrated user interface 32. The user interface 32 may have various numbers and types of buttons/controls, without limitation, and the buttons may have various functions, without limitation.

A shutter control switch 33 is located on housing side portion 12c. A user activates shutter control switch 33 in order to capture an image via the camera 16, as would be understood by one skilled in the art. A camera user interface 34 is provided on the housing rear portion 12b and includes buttons 34a,34b,34c,34d,34e disposed adjacent to the display 28, as illustrated. The illustrated user interface 34 enables a user to operate the camera 16 and display images taken via the camera 16, etc. For example, according to some embodiments of the present invention, button 34a is configured to allow a user to scroll forward through (i.e., "preview") images captured by the camera 16. Button 34a may have other functions, as well, such as serving as a "scroll up" button, etc. According to some embodiments of the present invention, button 34b serves as an on/off switch to power on and power off the apparatus 10. Button 34b may also serve the function of an "enter" button that allows a user to confirm/accept entries made via the user interface 34. According to some embodiments of the present invention, button 34c is configured to allow a user to scroll backward through images captured by the camera 16. Button 34c may have other functions, as well, such as serving as a "scroll down" button, etc. According to some embodiments of the present invention, buttons 34d,34e may be configured to serve as zoom buttons (e.g., optical zoom, digital zoom, etc.) for the camera 16, which would be understood by one skilled in the art.

Embodiments of the present invention are not limited to the illustrated user interface 34. The user interface 34 may have various numbers and types of buttons/controls, without limitation, and the buttons 34a,34b,34c,34d,34e may have various functions, without limitation.

Figure 8:
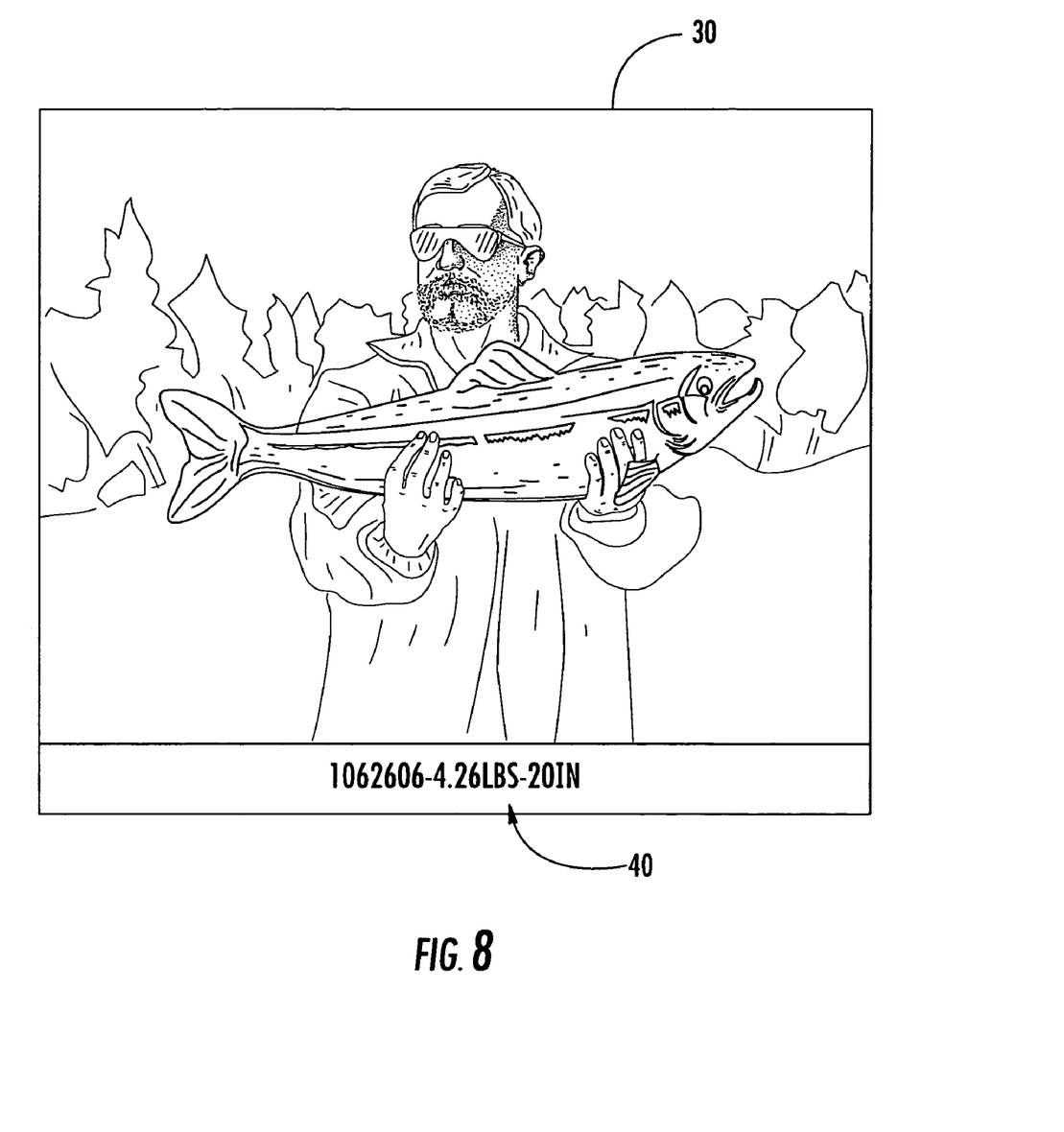
FIG. 8 illustrates an image taken by the camera of the handheld measuring apparatus of FIG. 1 wherein weight and length information is displayed within the image.

A processor (not shown) is disposed within the housing 12 and is in communication with, and controls operations of, the user interface 32,34 the scale 14, the camera 16, and the length measuring device 22 (and, according to some embodiments, tape measure 60, FIGS. 9–9A) as would be understood by one skilled in the art of the present invention. The processor is configured to communicate weight and length information from the scale 14 and length measuring device 22 to the camera 16 such that this information is displayed within images in the camera display 28. For example, as illustrated in FIG. 8, an image 30 includes weight and length information 40 for the fish displayed within the image 30.

The processor may also be configured to obtain other information and communicate this information to the camera for display within an image. Exemplary information includes, but is not limited to, time and date information, location information, weather information, bait information, GPS coordinates, etc.

According to some embodiments of the present invention, the apparatus 10 may include stored data (and/or may be capable of accessing remotely stored data) for a variety of items such as, but not limited to, bait information, descriptions of fish, locations of fish by region, body of water (e.g., fresh or salt water), location and season, fishing tips and tactics, etc. According to some embodiments of the present invention, the apparatus 10 can allow a user to easily determine game fish and bait fish types based on location and season, etc. For example, an information stream can be initiated by either location or game fish desired. When a desired fish is selected it will be displayed within the display along with a list possible bait options for either artificial or live bait. After a user selects a bait type, the apparatus 10 will display an image of the bait for that date and time.

A power source (not shown) is provided within the apparatus 10 that provides power to the scale 14, camera 16, length measuring device 22 and processor, as would be understood by one skilled in the art of the present invention. For example, one or more batteries may be disposed within housing 12 and configured to provide power to the scale 14, camera 16, and length measuring device 22. Other types of power sources may be utilized without limitation. For example, according to some embodiments of the present invention, the apparatus 10 may receive power, or some portion of power, from one or more photovoltaic cells ("solar cells") that convert radiant energy of sunlight directly into electrical energy.

Figure 2:
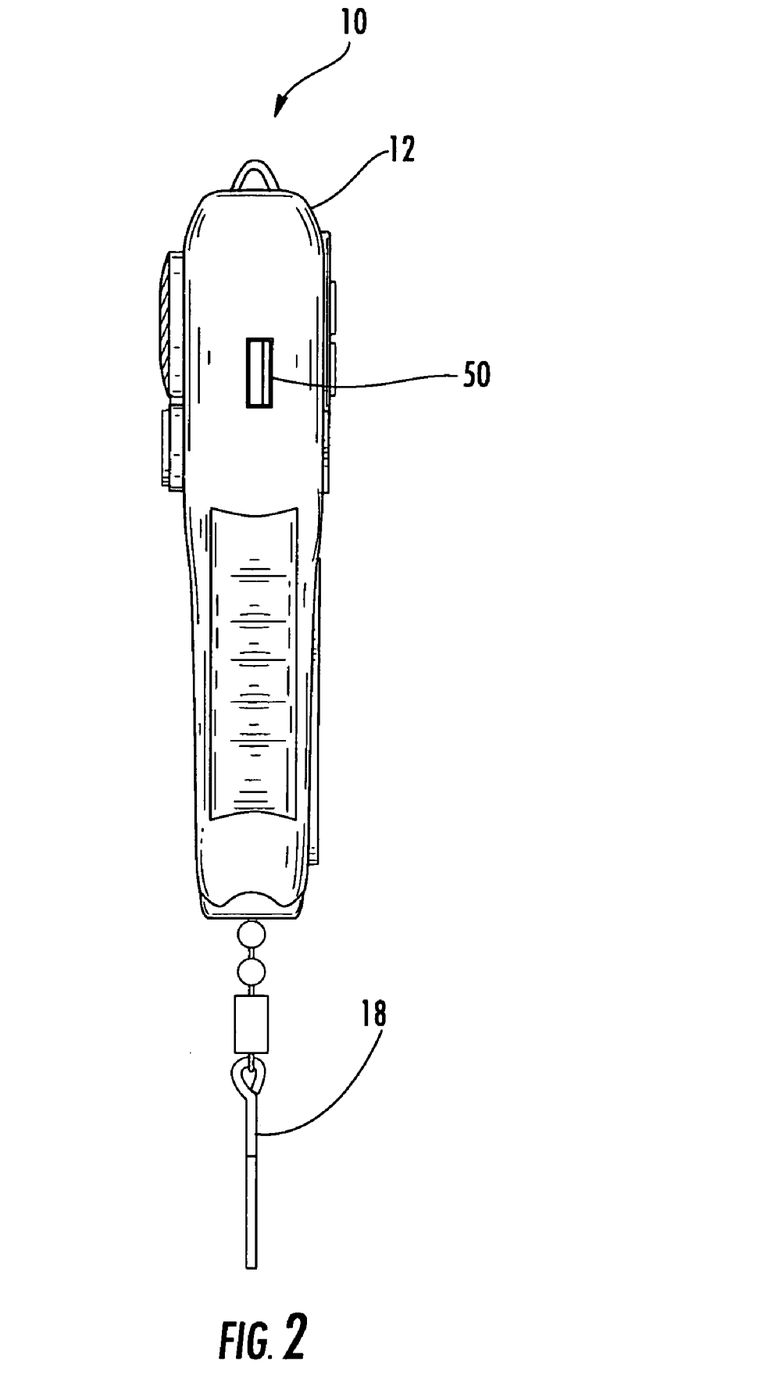
FIG. 2 is a side view of the handheld measuring apparatus of FIG. 1.

The illustrated apparatus 10 includes a port 40 (FIG. 2) that allows a user to import/export images and data to/from the apparatus 10. For example, a user may transfer an image captured by camera 16 to another device, such as a desktop computer, via the port 40. Port 40 may be any of various types of ports (e.g., USB ports, serial ports, etc.) without limitation.

An exemplary process for utilizing the apparatus 10 is now described. A user powers on the apparatus 10 via button 34b. A caught fish is secured to the free end 18a of support member 18, which activates the scale 14, and the fish is weighed. Button 32a is pressed by a user to input the weight information into the processor for display within an image. The fish is then laid flat on a surface for measuring the length thereof. The length measurement device 22 is reset to zero and a user then rolls the wheel 24 of the length measurement device 22 along the surface adjacent to the fish to determine the length of the fish. Button 32b is pressed by a user to input the length information into the processor for display within an image. An image of the fish is captured via camera 16. Buttons 34d,34e may be used to zoom the image, make the image tighter or wider, etc. The captured image may be previewed, stored or deleted. In addition, the captured image may be downloaded to another device, such as a computer.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. The invention is defined by the following claims, with equivalents of the claims to be included therein.

The invention claimed is:

1. A handheld measuring apparatus, comprising:
   a housing;
   a scale located within the housing that comprises a support member extending outwardly from the housing, and a display visible through the housing, wherein the support member is configured to suspend an object therefrom for weighing via the scale, and wherein the display is configured to display the weight of an object suspended from the support member;
   a camera located within the housing that comprises a lens that extends through the housing, an image sensor configured to capture images obtained via the lens, and a camera display visible through the housing, wherein the camera display is configured to display an image of an object captured by the image sensor; and
   a processor located within the housing, wherein the processor is configured to communicate weight information from the scale to the camera for display within the camera display with an image of an object displayed within the camera display.

2. The apparatus of claim 1, further comprising a length measurement device configured to measure the length of an object.

3. The apparatus of claim 2, wherein the camera display is configured to display an image of an object taken by the camera with length information for the object obtained from the length measurement device.

4. The apparatus of claim 2, wherein the length measurement device comprises a tape measure retractably extendable from the housing.

5. The apparatus of claim 2, wherein the length measurement device comprises a wheel rotatably mounted on the housing such that a portion of an outer periphery of the wheel can engage a surface, and wherein rotation of the wheel along a surface adjacent an object indicates a length of the object.

6. The apparatus of claim 1, wherein the housing is substantially water resistant.

7. The apparatus of claim 1, wherein the apparatus is buoyant.

8. The apparatus of claim 1, wherein the housing has an ergonomic shape that facilitates gripping by a user's hand.

9. The apparatus of claim 1, wherein the housing comprises tactile material that facilitates gripping by a user's hand.

10. The apparatus of claim 1, wherein the camera display is configured to display an image taken by the camera along with time and date information.

11. The apparatus of claim 1, further comprising a port in communication with the camera, and wherein the camera is configured to transfer an image to another device via the port.

12. A handheld measuring apparatus, comprising:
    a housing;
    a scale located within the housing that comprises a support member extending outwardly from the housing, and a display visible through the housing, wherein the support member is configured to suspend an object therefrom for weighing via the scale, and wherein the display is configured to display the weight of an object suspended from the support member;
    a length measurement device configured to measure the length of an object, comprising a wheel rotatably mounted on the housing such that a portion of an outer periphery of the wheel can engage a surface, and wherein rotation of the wheel along a surface adjacent an object indicates a length of the object; and
    a camera located within the housing that comprises a lens that extends through the housing, an image sensor configured to capture images obtained via the lens, and a camera display visible through the housing, wherein the camera display is configured to display an image of an object taken by the camera with weight information for the object obtained from the scale and length information for the object obtained from the length measurement device.

13. The apparatus of claim 12, wherein the housing is substantially water resistant.

14. The apparatus of claim 12, wherein the apparatus is buoyant.

15. The apparatus of claim 12, wherein the housing has an ergonomic shape that facilitates gripping by a user's hand.

16. The apparatus of claim 12, wherein the housing comprises tactile material that facilitates gripping by a user's hand.

17. The apparatus of claim 12, wherein the camera display is configured to display an image taken by the camera along with time and date information.

18. The apparatus of claim 12, further comprising a port in communication with the camera, and wherein the camera is configured to transfer an image to another device via the port.

19. A handheld measuring apparatus, comprising:
    a housing;
    a length measurement device configured to measure the length of an object, comprising a wheel rotatable mounted on the housing such that a portion of an outer periphery of the wheel can engage a surface, and wherein rotation of the wheel along a surface adjacent an object indicates a length of the object; and
    a camera located within the housing that comprises a lens that extends through the housing, an image sensor configured to capture images obtained via the lens, and a camera display visible through the housing, wherein the camera display is configured to display an image of an object captured by the image sensor with length information for the object obtained from the length measurement device.

20. The apparatus of claim 19, wherein the length measurement device comprises a tape measure retractably extendable from the housing.

21. The apparatus of claim 19, wherein the housing is substantially water resistant.

22. The apparatus of claim 19, wherein the apparatus is buoyant.

23. The apparatus of claim 19, wherein the housing has an ergonomic shape that facilitates gripping by a user's hand.

24. The apparatus of claim 19, wherein the housing comprises tactile material that facilitates gripping by a user's hand.

25. The apparatus of claim 19, wherein the camera display is configured to display an image taken by the camera along with time and date information.

26. The apparatus of claim 19, further comprising a port in communication with the camera, and wherein the camera is configured to transfer an image to another device via the port.

* * * * *